United States Patent [19]
Vandenbossche

[11] 3,887,967
[45] June 10, 1975

[54] SOLAR HEATER PANEL ARRAY SECURING APPARATUS

[75] Inventor: Benjamin Edward Vandenbossche, Menlo Park, Calif.

[73] Assignee: Fafco Incorporated, Menlo Park, Calif.

[22] Filed: Aug. 30, 1974

[21] Appl. No.: 501,895

[52] U.S. Cl........... 24/73 PB; 248/499; 248/74 PB; 24/279
[51] Int. Cl........................................... A44b 21/00
[58] Field of Search ........... 248/499, 500, 505, 510, 248/71, 74 B, 62, 69, 54, 74 PB, 231; 24/279, 73 SA, 20 LS, 243 AC, 243 H, 73 PB

[56] References Cited
UNITED STATES PATENTS

| | | | |
|---|---|---|---|
| 2,936,992 | 5/1960 | Browning | 248/499 |
| 3,719,971 | 3/1973 | Lodi | 24/73 PB |
| 3,815,855 | 6/1974 | Appleton | 248/74 B |

Primary Examiner—Geo. V. Larkin
Attorney, Agent, or Firm—Flehr, Hohbach, Test, Albritton & Herbert

[57] ABSTRACT

A hold down apparatus for an array of solar heating panels for maintaining them securely on a supporting structure. The solar heating panels are the type including a flat heat exchange body having channels for passing fluid therethrough running longitudinally within the body. An influx header and an eflux header are in communication with the fluid channels in the body at the ends thereof. Generally, the influx header is at a slightly lower elevation than the eflux header. The panel assemblies are configured for abutting engagement at the ends of the influx and eflux headers for side by side disposition of as many heating panels as desired. Eflux header hold down straps surround the joints between the eflux headers on adjacent heating panels. Influx header hold down straps surround the joints between the influx headers on adjacent heating panels. Strap attachment brackets are fixed to the support surface spaced from the influx and eflux headers on the sides thereof away from the flat heat exchange body for receiving the eflux and influx hold down straps. The influx hold down strap is more elastic than the eflux joint hold down strap, thereby yielding when the flat heat exchange body changes length dimension over a temperature range due to temperature coefficient of expansion. Stress is thereby removed from the influx and eflux header joints as well as the joints between the headers and the flat heat exchange body. A hold down, or center-tie line is stretched centrally across the width of the panel array, being affixed to the support surface on either side of each panel. The hold down line prevents lifting of the panels from the support surface by wind.

10 Claims, 3 Drawing Figures

3,887,967
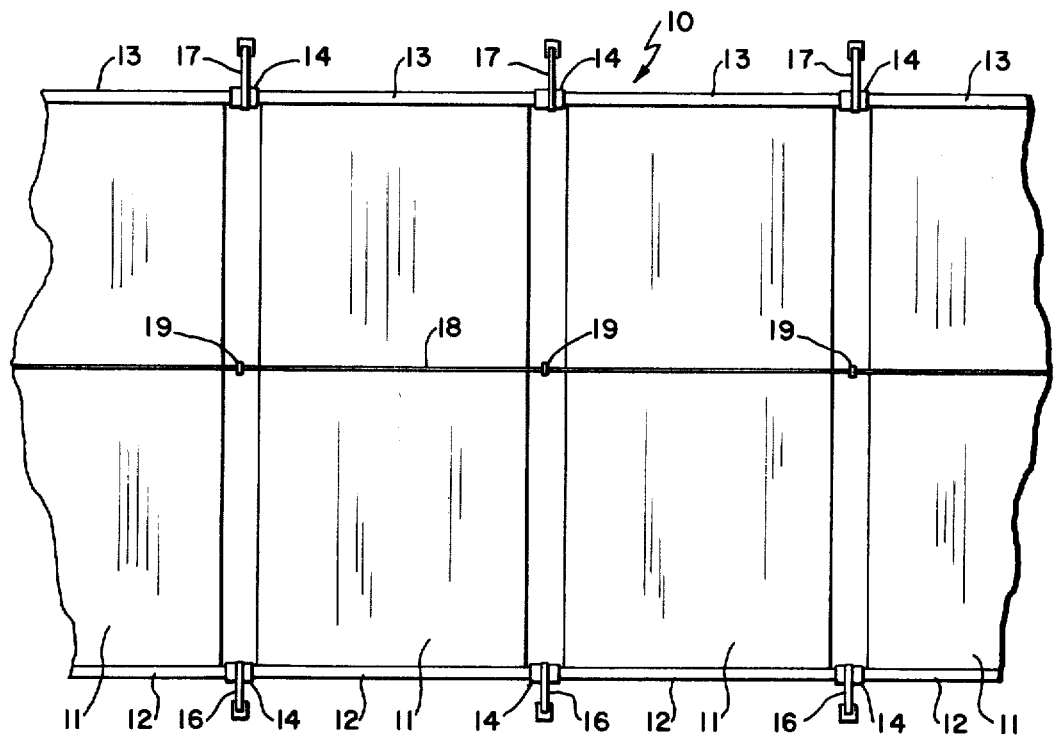
FIG.—1
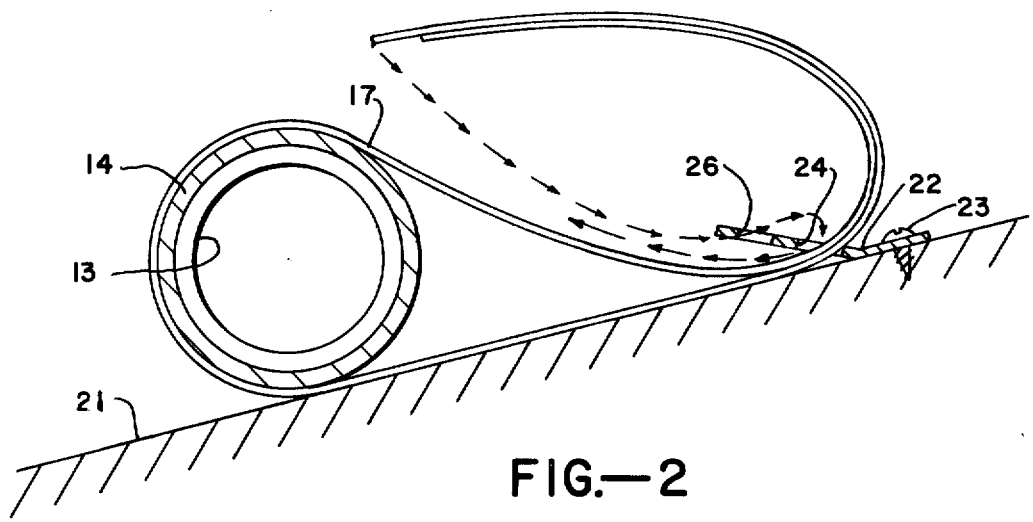
FIG.—2
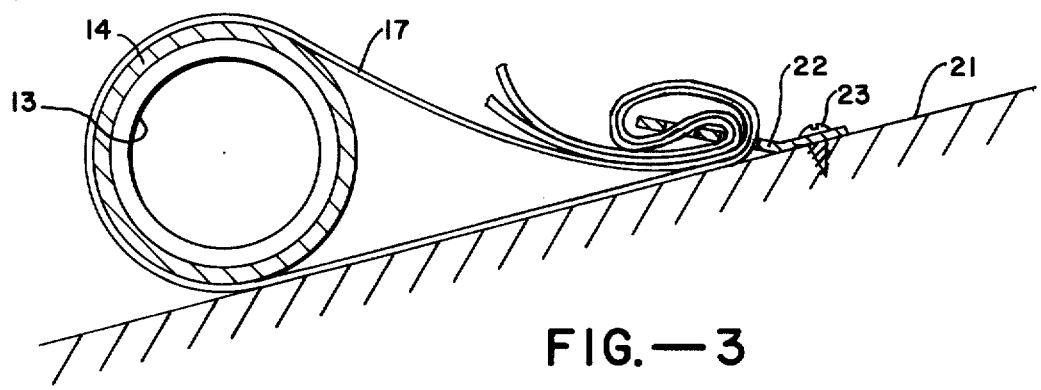
FIG.—3

SOLAR HEATER PANEL ARRAY SECURING APPARATUS

BACKGROUND OF THE INVENTION

The invention disclosed herein is directed to a hold down apparatus for a solar heating panel having fluid passages therethrough, and more particularly to a hold down apparatus for a multiple array of such heating panels which relieves joint stress therein and thereby prevents leaking from the fluid passages.

Solar heating panels are generally of material displaying comparatively large temperature coefficients of expansion. The environment in which the panels are placed is generally one in which wide temperature excursions may be seen. Panels may be subjected to temperatures extending from well below freezing upward to temperatures exceeding 160°F as solar energy is reflected from supporting surfaces. When heating panels are rigidly fixed to supporting surfaces the change in length dimension of the panels over the temperature range causes great stress to be imposed at the panel hold down points and throughout the panel. These hold down points are generally at joints on panel header members thereby creating danger of panel header joint leaks as well as actual separation of the headers from panel heat exchange bodies. Constant working of the heater panel material eventually always causes leaks and fluid passing through the heating panel passages escapes.

There is therefore a need for apparatus for holding down arrays of solar heating panels which will not impose stress on the materials in the heating panel structure, and which will therefore prevent leakage therefrom.

SUMMARY OF THE INVENTION AND OBJECTS

At least one heating solar panel is attached to a support surface. The heating panel is of the type having a flat channeled heat exchange body and influx and eflux header flow channels at each end for influx and eflux of fluid passing there-through. Heat is exchanged between the fluid and the environment surrounding the heating panel. The heating panel has joints for connecting the fluid inlet to the channels through the influx header of each heating panel, through the flat heat exchange body, and through the eflux header of each heating panel. First hold down straps surround the joints on the eflux headers and second hold down straps surround the joints on the influx headers. The second hold down straps are elastic in nature and yield as the heating panel changes length due to temperature coefficient of the panel material over the environmental temperature range. The first and second hold down straps are placed in tension at installation by attachment to means affixed to the support surface which are spaced from the headers on the side away from the heat exchange body. A center-tie line extends across the width of each heating panel also being affixed to the support surface on either side of each panel.

It is an object of the present invention to provide a hold down apparatus for an array of solar heating panels which will relieve the internal stress on the heater panels for preventing structural failure and consequent leakage.

It is another object of the present invention to provide a hold down apparatus for solar heating panels which will retain the panels in position during high winds.

It is another object of the present invention to provide a hold down apparatus for solar heating panels which yields over the environmental temperature excursion thereby reducing internal working and structural weakening of the heater panel material to a non-destructive level.

Additional objects and features of the invention will appear from the following description in which the preferred embodiment has been set forth in detail in conjunction with the accompanying drawings.

BRIEF DESCRIPTION OF THE DRAWINGS

FIG. 1 is a cut-away plan view of an array of solar heating panels held in place on a support surface.

FIG. 2 is a sectional elevation view of a hold down strap surrounding a solar heating panel header joint.

FIG. 3 is a sectional elevational view of a hold down strap fixed in a secured strap bracket.

DESCRIPTION OF THE PREFERRED EMBODIMENT

Referring to FIG. 1 an array of solar heating panels 10 such as those described in co-pending patent application, Ser. No. 410,630 entitled "Solar Heat Exchange Panel and Method of Fabrication", is shown. FIG. 1 shows a solar heating panel flat body 11 having multiple internal channels extending lengthwise therethrough as described in the above referenced copending application. An influx header 12 is shown on one end of flat panel body 11 having an interior channel in communication with the lengthwise passages in flat panel body 11. An eflux header 13 is shown at the opposite end of flat panel body 11 also having an interior channel in communication with the lengthwise passages through flat panel body 11. The solar heater panel assembly, including flat panel body 11 with influx and eflux headers 12 and 13 respectively attached thereto, may be joined at abutting joints at the ends of influx and eflux headers 12 and 13 to form an array of heating panels. The abutting joints may be sealed by means such as collar 14. In this embodiment, since the flat panel bodies 11 are separated by a space as seen in FIG. 1, an influx header hold down strap 16 surrounds collar 14 at the influx header joints and an eflux header hold down strap 17 surrounds collar 14 at the eflux header joints. Influx header hold down strap 16 has an elastic characteristic, while eflux header hold down strap 17 is substantially inelastic. Influx and eflux header hold down straps 16 and 17 are secured in means attached to a supporting surface for the heating panel array as is hereinafter described.

A center-tie or hold down line 18 is extended across the width of each of the flat panel bodies 11 and is secured to the supporting surface by means such as a bracket 19 on either side of each flat panel body 11 as seen in FIG. 1.

Turning to FIG. 2, a supporting surface 21 is seen which may be the roof of a house, an outbuilding or a patio. Support surface 21 may also be a structure specifically constructed to support the solar heater panel array 10. FIG. 2 shows a cross-section of the butt joint between the eflux headers 13. Illustration of the butt joint between influx headers 12 is identical and description of the hold down at the eflux header butt joints will suffice for both cases. Eflux header 13 is shown surrounded by collar 14, and collar 14 is shown surrounded by eflux hold down strap 17. A hold down strap bracket 22 is shown secured to support surface 21 by a screw 23. A sufficiently solid point on support surface 21 is selected on the side of headers 12 and 13 away from flat panel body 11 for accepting support screw 23. This is an advantageous feature of this invention for irregular support surfaces such as shake roofs. The strap brackets 22 need not be aligned relative to one another, but may be individually positioned to occupy a substantial holding point on surface 21. Hold down strap bracket 22 has, in this embodiment, two slots, 24 and 26, for receiving either hold down strap 17 or 16.

Turning to FIG. 3, it is seen that once a proper support position for screw 23 has been selected, the screw is placed in the support surface 21, whereupon the eflux hold down strap 17 is placed around the collar 14 which is sealing the butt joint between adjacent eflux headers 13. For purposes of the following description it will be assumed hold down strap 16 is already installed engaging influx header 12 around collar 14 thereon. Both ends of eflux hold down strap 17 are drawn through slot 24 in hold down strap bracket 22, around the end of hold down strap bracket 22, through the slot 26 from the opposite direction as shown, and back through slot 24 as shown in FIG. 3. The two ends of eflux hold down strap 17 are then pulled tightly to provide tension in eflux hold down strap 17. Thus tension is imparted to influx hold down strap 16 which has been installed in a similar manner as mentioned above. In this fashion the solar heating panel array 10 is held in the longitudinal direction of flat panel body 11 on the support surface 21.

The longitudinal hold down apparatus functions as follows. As the environmental temperature changes from well below freezing to temperatures above 160°F, as solar energy is reflected off of support surface 21, the material of the solar heating panel changes considerably dimensionally, as it is generally a material with a high temperature coefficient of expansion. As the lengthwise dimension shrinks for example, when temperatures go very cold, there is no destructive stress or strain set up at the joints between influx and eflux headers 12 and 13 and the flat panel body 11, or at the butt joints between the ends of the headers on adjacent panel assemblies. The stress and strain is relieved therefrom by elastic deformation which takes place in influx hold down straps 16 which stretch as the longitudinal dimension of flat panel body 11 contracts. In like fashion influx hold down strap 16 contracts as flat panel body 11 expands in higher temperatures, thereby remaining in tension and securely holding the heating panel array 10 against support surface 21.

Wind forces on the exposed surfaces of flat panel body 11 have a tendency to flatten body 11 more securely against support surface 21 in the absence of air turbulence. However, gusts and mechanically induced air turbulence may tend to cause flat panel body 11 to perform as a sail, separating from support surface 21. Center-tie, or hold down line 18, is therefore extended across the width of flat panel bodies 11 in the array 10 for preventing such separation from support surface 21. Center-tie 18 is secured to support surface 21 by means such as staples or inverted "U" shaped brackets screwed nto support surface 21 to maintain center-tie 18 in position across the width of the central portion of flat panel bodies 11.

It may be seen that an apparatus for securing a solar heating panel, or an array of solar heating panels, to a supporting surface has been disclosed which prevents stress at the joints in the fluid passages as the heating panels expand and contract throughout the environmental temperature range. The panel or array of panels is also held firmly to the supporting surface in the presence of high winds and air turbulence thereby preventing joint stress from panel body displacement due to wind forces. A securing apparatus for solar heating panels is therefore presented which relieves stresses normally felt by the flow passage joints, and thereby prevents flow passage joint failure and subsequent leaks over prolonged periods of use.

I claim:

1. An apparatus for securing a solar heating panel array to a supporting structure using heating panels having a flat central portion presenting maximized area to the environment with a plurality of channels extending through the flat central portion for carrying a fluid for exchanging heat with the environment, and having headers on each end of the central portion in communication with the channels, and joints for attaching the headers to other headers on adjacent panels for side by side disposition thereby providing increased panel area for contact with the environment, comprising a plurality of first straps for surrounding the joints between the panels on one end thereof,
a plurality of second straps for surrounding the joints between the panels on the other end thereof,
means for receiving ones of said plurality of first and second straps for holding therein, said means for receiving being secured to the supporting structure,
said second straps having greater elasticity than said first straps, whereby when said first and second straps are placed in tension in opposing directions and the heating panels change dimensionally over a temperature range due to temperature coefficient of expansion of the panel material, said second straps yield thereby preventing leakage at the joints by relieving stress on the joints.

2. An apparatus as in claim 1 together with a line running across the flat central portions and means for attaching said line to the supporting structure on either side of each of the panels, whereby the flat central portions of the panels are held closely to the supporting structure during high wind conditions.

3. An apparatus as in claim 1 wherein said first strap is nylon, said second strap is vinyl, and said means for receiving are metal brackets for receiving loops of said first and second straps.

4. An apparatus for securing an array of solar heating panels on a supporting structure, wherein the solar heating panels are of the type having a flat central panel for contact with an environment, with channels running therethrough for carrying fluid for exchanging heat with the environment, and having an upper header on one end of the central panel and a lower header on the other end of the central panel, both upper and lower headers being in communication with the channels so that a plurality of such heating panels may be attached side by side at header butt joints thereby providing increased panel area for contact with the environment, comprising upper straps for surrounding the upper header butt joints, lower header straps for surrounding the lower header butt joints, said lower header straps being more elastic than said upper header straps, and means attached to the supporting structure spaced above the upper headers and spaced below the lower headers for receiving and holding said upper and lower straps respectively, whereby when said upper and lower straps are placed in tension and the panel length dimensions change due to enviromental temperature excursions, said lower straps yield, relieving strain at the header butt joints.

5. An apparatus as in claim 4 together with at least one hold down line positioned above the panels across the width thereof, and means for affixing said hold down line to the supporting structure on each side of each of the panels, so that wind may not lift the panels.

6. An apparatus as in claim 5 wherein said upper header strap is nylon and said lower header strap strap is vinyl.

7. Hold down apparatus for affixing to a support solar heating panels having a flat channelled heat exchange body and header flow channels for influx and eflux from the body channels, wherein there is at least one such heating panel with joints on the header ends of the flow channels for connecting the influx and eflux thereto comprising at least one pair of first hold down straps for surrounding the joints at each end of the eflux header flow channel, at least one pair of second hold down straps for surrounding the joints at each end of the influx header flow channel, means spaced from the header flow channels attached to the support for receiving said first and second pairs of hold down straps, a hold down line extending across the width of the heat exchange body, and means for attaching said hold down line to the support on each side of the heat exchange body to prevent lifting by the wind, said second hold down straps being more elastic than said first hold down straps, whereby when said first and second hold down straps are placed in tension said second hold down straps yield as the heat exchange body changes longitudinal dimensions over a temperature range due to temperature coefficient of expansion.

8. Hold down apparatus as in claim 7 wherein said first pair of hold down straps is nylon and said second pair of hold down straps is a vinyl material.

9. An apparatus for securing at least one solar heating panel to a support surface, first and second opposing hold down means for engaging the solar heating panel at opposite sides thereof, means for securing said first and second hold down means to the support surface spaced from the solar heating panel, said second hold down means being elastic along the dimension extending from said means for securing to the solar heating panel, whereby dimensional changes in the solar heating panel are compensated by yielding in said second hold down means, thereby relieving destructive internal stress within the solar heating panel structure.

10. Apparatus as in claim 9 together with means overlying the solar heating panel and means for securing said means overlying to the support surface, whereby forces tending to separate the solar heating panel from the support surface are opposed by said overlying means thereby relieving internal stress in the solar heating panel imposed by displacement thereof from the support surface.

* * * * *